United States Patent [19]

Sipsas et al.

[11] Patent Number: 5,198,505
[45] Date of Patent: Mar. 30, 1993

[54] UNIFORM POLYVINYLIDENE DIFLUORIDE MEMBRANES

[75] Inventors: Ioannis P. Sipsas, Forest Hills; Isaac Rothmann, Brooklyn; Irving Joffee, Huntington, all of N.Y.

[73] Assignee: Pall Corporation, Glen Cove, N.Y.

[21] Appl. No.: 683,817

[22] Filed: Apr. 11, 1991

[51] Int. Cl.$^5$ ............... C08F 14/22; B01D 71/34
[52] U.S. Cl. ............... 525/326.2; 210/500.42; 521/145; 526/255; 528/503
[58] Field of Search ............... 210/500.42; 525/326.2; 526/255; 528/503

[56] References Cited

U.S. PATENT DOCUMENTS

| | | | |
|---|---|---|---|
| 4,341,615 | 7/1982 | Bachot | 204/296 |
| 4,776,959 | 10/1988 | Kasai et al. | 210/490 |
| 4,845,132 | 7/1989 | Masuoka et al. | 521/53 |
| 4,851,121 | 7/1989 | Yokota et al. | 210/500 |
| 5,079,272 | 1/1992 | Allegrezza | 521/134 |

FOREIGN PATENT DOCUMENTS 0175322 3/1986 European Pat. Off. .
3835612 10/1987 Fed. Rep. of Germany .

OTHER PUBLICATIONS

Asahi Chem. Ind. KK (Derwent Accession No. 83-708,277, Questel Telesystem (WPIL), Abst. of Japanese Document 58/093,734, Kokai.

Primary Examiner—Joseph L. Schofer
Assistant Examiner—Fred Zitomer
Attorney, Agent, or Firm—Leydig, Voit & Mayer

[57] ABSTRACT

A heat-treated, hydrophobic, polyvinylidene difluoride membrane is provided having uniform crystallinity as evidenced by a difference in crystallinity over the membrane of less than about 10 percent. Also provided is a hydrophilic, polyvinylidene difluoride membrane prepared from a heat-treated, hydrophobic, polyvinylidene difluoride membrane which remains hydrophilic after heating to a temperature as high as about 121° C.

6 Claims, No Drawings

UNIFORM POLYVINYLIDENE DIFLUORIDE MEMBRANES

FIELD OF THE INVENTION

This invention relates to a polyvinylidene difluoride (PVDF) membrane. More particularly, it relates to microporous PVDF membranes which are capable of conversion to a hydrophilic form and which, when converted, have substantially uniform hydrophilic properties.

BACKGROUND OF THE INVENTION

Microporous membranes useful as filter materials are frequently made from materials which are thermoplastic polymers, an example of which is PVDF. Membranes made from PVDF are generally chemically inert and, as such, are useful for filtration of a wide variety of fluids. However, membranes made from PVDF are not inherently wettable by water. The natural hydrophobicity of PVDF membranes limits their usefulness in the filtration of aqueous solutions. In practice, this limitation is overcome by treating the PVDF membrane by a process which modifies its exposed surfaces to make it hydrophilic.

Many such processes have been described in the art. In U.S. Pat. No. 4,774,132, a PVDF membrane is first treated with strong alkali following which a polymer of acrylic acid is grafted onto its surface. In U.S. Pat. No. 4,341,615, a crosslinked polymer formed from acrylic acid, a multiply unsaturated crosslinking agent and a free-radical polymerization initiator is formed in situ in the porous structure, thereby imparting hydrophilicity to the membrane. Other processes for rendering a PVDF membrane hydrophilic are also known to those skilled in the art of membrane and filtration technology.

Different wetting properties are required for different applications of membranes. Some applications require wettability by liquids of extremely high surface tensions, while others only require wettability by water. Such different degrees of wettability can be imparted to hydrophobic PVDF membranes by selection of an appropriate process such as one of those cited above. In order to be useful as a filtration material, however, the wetting properties of the membrane should be as uniform as possible and the membrane should also be as mechanically sound as possible. While the processes known to make PVDF membranes hydrophilic are generally successful, the product is not always uniform with respect to its wetting and mechanical properties. This is generally a reflection of the non-uniform nature of the starting material, i.e., the hydrophobic PVDF membrane.

SUMMARY OF THE INVENTION

It is the object of this invention to overcome the difficulties described above. More specifically, it is an object of this invention to provide a PVDF membrane having more uniform characteristics in order to be able to prepare a hydrophilic PVDF membrane with uniform wetting and mechanical properties. It is a further object of this invention to provide a method for making a PVDF membrane having more uniform physical properties. It is a still further object of this invention to provide a means for making a hydrophilic thermoplastic polymer membrane having uniform wetting and mechanical properties which remain hydrophilic even after being heated to a temperature as high as about 121° C.

Membranes made from thermoplastic polymers, such as PVDF membranes, are usually made by phase-inversion processes wherein the precipitation of polymer in the form of a membrane is either thermally or solvent-induced from a polymer solution. After the membrane is formed, it is typically washed and dried before being processed further into a hydrophilic filter material. The economics of membrane manufacture dictate that the membrane be dried in continuous lengths as rapidly as possible.

Surprisingly, it has been found that the wetting properties of the resultant hydrophilic PVDF membrane depend on the thermal history of the hydrophobic PVDF membrane from which it was made. A hydrophilic membrane made from a conventional hydrophobic PVDF membrane which had previously been heated for some time at an elevated temperature, e.g., at about 100° C., has a higher critical wetting surface tension (CWST) than a hydrophilic membrane made from a similar, but unheated, hydrophobic PVDF membrane. (The term "critical wetting surface tension" as used herein refers to the wetting characteristics for a porous media as defined in detail in U.S. Pat. No. 4,923,620 which is incorporated herein by reference. Basically, it is an indication of the ability of a porous medium to absorb or be wetted by a liquid with a specified surface tension.) Additionally, if the membrane had been subjected to potentially degrading chemical reactions during the hydrophilization process, the mechanical properties of the PVDF substrate are better retained after the hydrophilization process than if the PVDF membrane had not been first heated in such a manner. Furthermore, it has been found that when a PVDF membrane is hydrophilized after having been heated as described above, its wetting properties are more uniform and superior to those of a similar membrane which had not first been heated but had been hydrophilized by the same method.

While the effect of heat on the PVDF membrane is not completely understood, it is believed that heating the hydrophobic membrane before hydrophilization alters the crystallinity of the polymer making up the membrane and brings substantially all of the polymer in the membrane to the same state of crystallinity. It is further believed that hydrophilization of a more highly crystalline membrane leads to a hydrophilic membrane having a higher CWST and greater mechanical strength than does similar treatment of a less crystalline membrane.

Despite the use of careful controls during membrane drying processes, even though the membrane emerges from these processes in the dry state, i.e., there is no residual moisture in the membrane, the crystallinity of the resultant dry membrane is not uniform. Depending on the drying process used, it is often observed that there are irregularly shaped areas in the membrane sheet which do not have the same crystallinity as that of the bulk of the membrane. Further, sometimes one side of the membrane does not have the same crystallinity as the other side, or other non-uniformities in crystallinity are observed.

Such non-uniformity is undesirable because after the membrane is hydrophilized these areas of differing crystallinity appear as areas which have different CWST, color, or mechanical properties from that of the bulk of the membrane. For example, they may appear as hydrophobic areas in a generally hydrophilic membrane sheet, as discolored areas, or as weak spots. The subject invention is directed to bringing the dry PVDF membrane to a state of uniform characteristics, thereby enabling the production of a hydrophilic membrane having uniform wetting and mechanical properties.

BEST MODE FOR CARRYING OUT THE INVENTION

In accordance with this invention a dry, thermoplastic, microporous PVDF membrane, typically having a pore rating in the range of from about 0.01 to about 1.0 micrometer, is heated to a temperature of about 80° C. or higher for a time sufficient to achieve a state such that, when subsequently hydrophilized, the resultant hydrophilized membrane has substantially uniform hydrophilic properties. By "substantially uniform hydrophilic properties" is meant that the membrane exhibits substantially the same response when contacted with a liquid regardless of the position on a given surface of the membrane. In general, the only upper restriction on temperature is that the temperature must not be so high that the membrane becomes soft and deforms, either under its own weight or due to tension from any mechanical means by which the membrane is supported during the heating process. Typically, this upper temperature limitation will be about 160° C.

The higher the heating temperature, the shorter the period of time required to ensure uniformity of the membrane. The time required for the process depends on the heating method used and on the bulk form of the membrane while it is heated. Small pieces of membrane in flat sheet form which are in direct contact with a heated surface may require only a brief exposure, e.g., less than a minute, to heat because of the large exposed area available for transfer of heat to the membrane. On the other hand, a membrane which is rolled up tightly in a roll containing hundreds of linear feet of material may require many hours for all the membrane to come to an equilibrium temperature.

Any means for heating the membrane may be employed. However, the source of heat must be controlled so that no portion of the membrane exceeds the temperature at which deformation occurs, typically about 160° C. Further, any mechanical means used to support the membrane during the heating process must not damage the membrane due to pressure, tension, or other physical contact with the membrane.

It has been found convenient to make PVDF membrane having uniform properties by heating rolls containing from about 500 to about 1000 linear feet of dry membrane in a circulating air oven. In general, when a roll of membrane is heated in this manner, a minimum period of about sixteen hours is required for all sections of the roll of membrane to become heated to the same temperature. After sufficient time for all sections of the membrane to come to the same temperature and then for the crystallinity of all areas of the membrane to reach the same level, the resultant membrane can be hydrophilized by known means to yield a membrane with stable, uniform wetting and mechanical properties.

When heating a roll of PVDF membrane in an oven, temperatures ranging from about 80° C. to about 160° C. may be used. When a temperature of 80° C. is used, the time required to achieve uniformity is about sixty-four hours. When the heating temperature is 120° C. or higher, a period of about sixteen hours is generally sufficient. Heating temperatures ranging from 80° to 145° C. are preferred. Temperatures ranging from about 100° C. to about 120° C. are most preferred. In this temperature range uniformity is achieved in a practical period of time and no change in structure, pore size, or overall dimensions of the membrane is observed.

The minimum degree of crystallinity which is required depends on the method which will be used to make the thermoplastic membrane uniformly hydrophilic. This can be determined easily by evaluating hydrophilic membranes made from heated membranes according to means known to those skilled in the art. However, in general, the higher the degree of crystallinity, the more uniform the membrane is and the higher the CWST which can be achieved by any given means of hydrophilization. Furthermore, the higher the degree of crystallinity of the PVDF membrane, the more stable the hydrophilic surface will be when exposed to heat. This is useful because such membranes can be exposed to temperatures such as those seen in autoclave or dry heat sterilization cycles, e.g., at about 121° C., without the membrane losing its hydrophilic character.

Typically, a PVDF membrane, after heat treatment in accordance with this invention, will demonstrate differences in crystallinity over the membrane of less than about 10 percent and preferably less than about 5 percent. Crystallinity is typically determined by X-ray crystallography or differential scanning colorimetry.

AREA OF INDUSTRIAL APPLICABILITY

Membranes in accordance with the invention after conversion to a hydrophilic form have uniform hydrophilicity, high mechanical strength, high CWST, and retain their hydrophilic characteristics after exposure to heat, for example, during autoclaving. They are useful in many filtration applications and particularly useful in the food-processing and pharmaceutical industries where sanitization or sterilization by means of heat is required.

We claim:

1. A heat-treated, hydrophobic, polyvinylidene difluoride membrane having uniform crystallinity as evidenced by a difference in crystallinity over the membrane of less than about 10 percent.

2. The membrane of claim 1 wherein the difference in crystallinity is less than about 5 percent.

3. A hydrophilic, polyvinylidene difluoride membrane prepared from a heat-treated, hydrophobic, polyvinylidene difluoride membrane which remains hydrophilic after heating to a temperature as high as about 121° C.

4. The membrane of claim 1 wherein the temperature of heat treatment is at least about 80° C. but less than the temperature at which the membrane softens and deforms.

5. The membrane of claim 4 wherein the temperature of heat treatment is in the range of about 80° C. to about 160° C.

6. The membrane of claim 3 wherein said hydrophilic membrane has a higher critical wetting surface tension than a hydrophilic polyvinylidene difluoride membrane prepared from the same, but non-heat-treated, hydrophobic membrane.

* * * * *